US011149871B2

(12) United States Patent
Dohi et al.

(10) Patent No.: US 11,149,871 B2
(45) Date of Patent: Oct. 19, 2021

(54) FLOW RATE ADJUSTMENT VALVE, AND FLUID CONTROL APPARATUS IN WHICH THE FLOW RATE ADJUSTMENT VALVE IS USED

(71) Applicant: FUJIKIN INCORPORATED, Osaka (JP)

(72) Inventors: Ryousuke Dohi, Osaka (JP); Taiji Chiba, Osaka (JP); Kazunari Watanabe, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 199 days.

(21) Appl. No.: 16/343,536

(22) PCT Filed: Oct. 25, 2017

(86) PCT No.: PCT/JP2017/038478
§ 371 (c)(1),
(2) Date: Apr. 19, 2019

(87) PCT Pub. No.: WO2018/079586
PCT Pub. Date: May 3, 2018

(65) Prior Publication Data
US 2019/0316703 A1    Oct. 17, 2019

(30) Foreign Application Priority Data
Oct. 26, 2016  (JP) .............................. JP2016-209557

(51) Int. Cl.
*F16K 31/04*  (2006.01)
*F16K 31/53*  (2006.01)
(Continued)

(52) U.S. Cl.
CPC ............ *F16K 31/047* (2013.01); *F16K 31/53* (2013.01); *F16K 37/00* (2013.01); *G05D 7/0635* (2013.01)

(58) Field of Classification Search
CPC .......... F16K 7/16; F16K 31/047; F16K 31/53; F16K 31/508; F16K 31/046; F16K 37/00; G05D 7/0635
See application file for complete search history.

(56) References Cited

U.S. PATENT DOCUMENTS 3,137,475 A * 6/1964 Schoenecker ......... F16K 31/047
                                                251/69
4,556,193 A * 12/1985 Yoshiga ................. F25B 41/31
                                               251/129.11
(Continued)

FOREIGN PATENT DOCUMENTS

CN        103107767 A    5/2013
CN        104791544 A    7/2015
(Continued)

OTHER PUBLICATIONS

Office Action dated Apr. 10, 2020, issued for the Korean Patent Application No. 10-2019-7013798 and English translation thereof.
(Continued)

*Primary Examiner* — Eric Keasel
(74) *Attorney, Agent, or Firm* — Locke Lord LLP (57) ABSTRACT

Provided is a flow rate adjustment valve of a motor-operated valve type, which overcomes the problems that flow rate adjustment valves of a manual valve type have, while making full use of compactness the manual valves have. The flow rate adjustment valve includes a rotation device that rotates a rotation member to cause a vertically movable body to move vertically. The rotation device includes: a driven gear disposed at an upper end portion of the rotation member; and a motor that rotates a driving gear engaged (Continued)

with the driven gear. The motor, which is a stepping servo motor, is disposed below the driving gear and has a rotary shaft extending upward. The driving gear is fixed to an upper end portion of the rotary shaft.

7 Claims, 4 Drawing Sheets

(51) Int. Cl.
*F16K 37/00* (2006.01)
*G05D 7/06* (2006.01)

(56) References Cited

U.S. PATENT DOCUMENTS

| | | | |
|---|---|---|---|
| 6,321,780 B1 | 11/2001 | Iwabuchi | |
| 6,371,162 B1 * | 4/2002 | Groeneveld | F16K 31/046 137/613 |
| 7,025,329 B2 * | 4/2006 | Winter | F16K 1/38 251/129.11 |
| 8,408,518 B2 * | 4/2013 | Schade | F16K 31/53 251/129.12 |
| 2013/0090761 A1 | 4/2013 | Sejimo et al. | |
| 2014/0374637 A1 | 12/2014 | Nakamura et al. | |
| 2015/0316168 A1 | 11/2015 | Lv | |

FOREIGN PATENT DOCUMENTS

| | | |
|---|---|---|
| JP | H2-78878 U | 6/1990 |
| JP | H08-064490 A | 3/1996 |
| JP | H11-111116 A | 4/1999 |
| JP | 2001-004062 A | 1/2001 |
| JP | 2001-208230 A | 8/2001 |
| JP | 2003-194671 A | 7/2003 |
| JP | 2008-169863 A | 7/2008 |
| JP | 2009-197765 A | 9/2009 |
| JP | 2016-505777 A | 2/2016 |
| WO | 2013/100052 A1 | 7/2013 |

OTHER PUBLICATIONS

Office Action and Search Report dated Oct. 11, 2019, issued for the corresponding CN patent application No. 201780065702.X and an English Translation of the Office Action.

International Search Repport dated Dec. 19, 2017, issued for PCT/JP2017/038478.

* cited by examiner

FLOW RATE ADJUSTMENT VALVE, AND FLUID CONTROL APPARATUS IN WHICH THE FLOW RATE ADJUSTMENT VALVE IS USED

TECHNICAL FIELD

The present invention relates to a flow rate adjustment valve, and a fluid control apparatus in which the flow rate adjustment valve is used.

BACKGROUND ART

The fluid control apparatus is an essential component for a semiconductor manufacturing line.

The flow rate adjustment valve used in the fluid control apparatus has a structure in which a vertically movable body adjusts an opening degree of a fluid passage, the opening degree of the fluid passage being defined by an valve element, and a rotation member that is screwed on the vertically movable body is rotated, whereby the vertically movable body moves upward or downward, in order to achieve adjustment of the opening degree of the fluid passage, which opening being defined by the valve element.

Regarding the rotation of the rotation member, one structure is configured to rotate the rotation member by turning a handle by hand (manual valve type), and another structure is configured to rotate the rotation member electrically (motor-operated valve type).

Many fluid control apparatuses are used for one semiconductor manufacturing line. There are not a few cases in which such a fluid control apparatus is installed in a limited space, in order to make the manufacturing line compact and due to constraints of manufacturing process conditions.

Under such circumstances, flow rate adjustment using the manual valve type has to be performed, for example, by a procedure as follows: an operator stretches out his/her hand to 8 to 14 lines of flow rate adjustment valves that are located in secluded areas below the fluid control apparatus to perform adjustment while looking at the scale of the flow rate adjustment valve using a mirror or the like when required, and, at the same time, looking at an indication about the flow rate of a mass flow meter for the corresponding line, to delicately turn the handle by hand and adjust the flow rate which is displayed on the massflow meter with a fine scale. This procedure has to be followed for all the fluid control apparatuses installed in the manufacturing line, which is a troublesome work requiring time and effort and fails to take advantage of using small-sized manual valves.

In contrast, regarding the flow rate adjustment for the valve of a motor-operated valve type (for example, Patent Literature 1 and Patent Literature 2), because the flow rate adjustment does not directly require an operator, the problems as discussed for the above-described manual valve type do not exist.

CITATION LIST

Patent Literature

Patent Literature 1: Japanese Unexamined Patent Application Publication JP-A-2001-4062

Patent Literature 2: Japanese Unexamined Patent Application Publication JP-A-H8-64490

SUMMARY OF INVENTION

Technical Problem

However, in the case of Patent Literature 1, because a stepping motor is disposed externally, there is a problem of an increased volume of the apparatus by the volume of the externally disposed stepping motor, while, in the case of Patent Literature 2, because the built-in rack and pinion are driven to control the opening degree of the valve element, there is a problem that not only the volume for the rack and pinion but also the volume required for the vertical movement are required.

The present invention has been made in view of the above-described problems, and a principal object of the present invention is to provide a flow rate adjustment valve of a motor-operated valve type, which overcomes the problems that flow rate adjustment valves of a manual valve type have, while making full use of compactness the manual valves have.

Solution to Problem

The flow rate adjustment valve in accordance with the present invention is a flow rate adjustment valve including: a body provided with a fluid passage; a valve element configured to open and close the fluid passage; a vertically movable body that moves upward or downward whereby an opening degree of the fluid passage is adjusted, the opening degree of the fluid passage being defined by the valve element; a rotation member that is screwed on the vertically movable body; and a rotation device configured to rotate the rotation member thereby causing the vertically movable body to move upward or downward, wherein the rotation device comprises a driven gear disposed at a part of the rotation member, a driving gear engaged with the driven gear, and a motor configured to rotate the driving gear, and the motor is a stepping servo motor and has a rotary shaft to which the driving gear is fixed.

The vertically movable body, the rotation member, and the rotation device constitutes opening degree setting means that is configured to set the opening degree of the fluid passage at a predetermined position.

The stepping servo motor is a stepping motor in which an encoder is incorporated. The stepping servo motor is configured to rotate a rotary shaft of the motor every predetermined angle by switching current that is caused to flow through a motor coil depending on pulse signals transmitted from a controller. At the same time, with feedback on the present position and speed from the encoder, errors from the operation command pulses are corrected, whereby closed loop control is performed.

The rotating device includes: the driven gear disposed at a part of the rotation member; the driving gear engaged with the driven gear; and the motor configured to rotate the driving gear. Because the driving gear is fixed to the rotary shaft of the motor, the dimensions of the entire flow rate adjustment valve is allowed to be small, and moreover, because the motor is a stepping servo motor in which the encoder is incorporated, the motor per se is allowed to be small. This allows the size of the flow rate adjustment valve in which the motor is used to be approximately equal to that of the flow rate adjustment valve of a manual valve type.

It is preferable that the motor is disposed so as to be adjacent to the rotation member, the rotary shaft of the motor extends upward, and the driving gear is fixed to an upper end portion of the rotary shaft. This configuration enables the flow rate adjustment valve in which the motor is used to be more compact.

It is preferable that, for example, the motor has a transverse cross section having the shape of a square of side 35 mm or shorter, the flow rate adjustment valve has a transverse cross section having the shape of a rectangle with short sides thereof each being 36 mm or shorter, and resolution of the motor when the opening degree is from 0% to 100% is 2000 pulses or greater.

This configuration enables the flow rate adjustment valve that is sufficient in terms of its dimension and its precision, when the existing flow rate adjustment valve of a manual valve type is to be replaced.

It is preferable that the motor has four functions of: position control of controlling a position with a closed loop by signals from an encoder; speed control of controlling a rotational speed of the rotation member; pressing-against control of moving the rotation member in a 0% opening-degree direction at continuous rated torque or lower until a torque value reaches a predetermined value or greater; and torque control of controlling torque, and detection of a 0% opening-degree position is performed by the function of the pressing-against control, a setting of a predetermined opening degree is performed by the function of the position control and the function of the speed control, and when the detection of the 0% opening-degree position and the setting of the predetermined opening degree are performed, a torque abnormality is determined by the function of the torque control.

With the function of the speed control, the moving speed of the vertically movable body is maintained at approximately the same level as that in the case where the moving operation is performed by hand, and the stability of the speed ensures the durability. In addition, with the function of the torque control, performing maintenance before the flow rate adjustment valve breaks down so completely that it becomes impossible to operate it, prevents the flow rate adjustment valve from being broken during the process, which, in turn, prevents the process from suffering tremendous damage. As discussed above, it is possible to prevent, in advance, the flow rate adjustment valve from being damaged due to overload that is concerned when the flow rate adjustment valve of the manual valve type is to be replaced with that of the motor-operated type.

The fluid control apparatus in accordance with the present invention is a fluid control apparatus including a plurality of lines each having a flow rate adjustment valve in which an opening degree is set at a predetermined value, wherein each of the flow rate adjustment valves of the plurality of the lines is either of the flow rate adjustment valves described above, and an amount of motion of the motor of each flow rate adjustment valve is monitored by a monitoring device connected by means of communication means.

With the fluid control apparatus in accordance with the present invention, it is possible to set, using the motor, the opening degree of the flow rate adjustment valve in which the opening degree has been conventionally set by hand, and at the same time, it is possible to monitor the opening degrees of all the flow rate adjustment valves using the monitoring device. It is, therefore, possible to increase the fluid control function of the fluid control apparatus.

As the monitoring device, personal computers, tablet computers, smartphones, and the like are used. The communication means may be wireless, wired, or one using the Internet.

To the flow rate adjustment valve, any measuring equipment that transmits signals of such as images (video), temperature and/or humidity, acceleration (vibration), and sound, in addition to torque (rotation, current), may be added as appropriate. And after transmitting operation instructions from the monitoring device, whether the operations are actually performed as instructed can be confirmed. Other than various types of measuring equipment, a microelectromechanical system (MEMS) sensor, a small-sized charge coupled device (CCD) camera, and the like may be used for the measuring equipment. Furthermore, by providing a control function in the monitoring device and the measuring equipment, adjustment of the flow rate to a target value may be performed automatically.

Advantageous Effects of Invention

In accordance with the flow rate adjustment valve of the present invention, because it is possible to make the vertical dimension of the flow rate adjustment valve small and to make the size of the motor per se small, it becomes possible to make the size of the flow rate adjustment valve, in which the motor is used, approximately equal to that of the manual valve type. This flow rate adjustment valve is, therefore, applicable to a fluid control apparatus in which the flow rate adjustment valve of the manual valve type is being used and in which the space for the flow rate adjustment valve cannot be enlarged.

REFERENCE SIGNS LIST

1: flow rate adjustment valve
2: body
2a: fluid inflow passage (fluid passage)
2b: fluid outflow passage (fluid passage)
4: diaphragm (valve element)
6: vertically movable body
11: motor (rotation device)
13: driving gear (rotation device)
14: driven gear (rotation device)
15: rotation member
34: rotary shaft
50: fluid control apparatus
53: personal computer (monitoring device)

DESCRIPTION OF EMBODIMENTS

Figure 1:
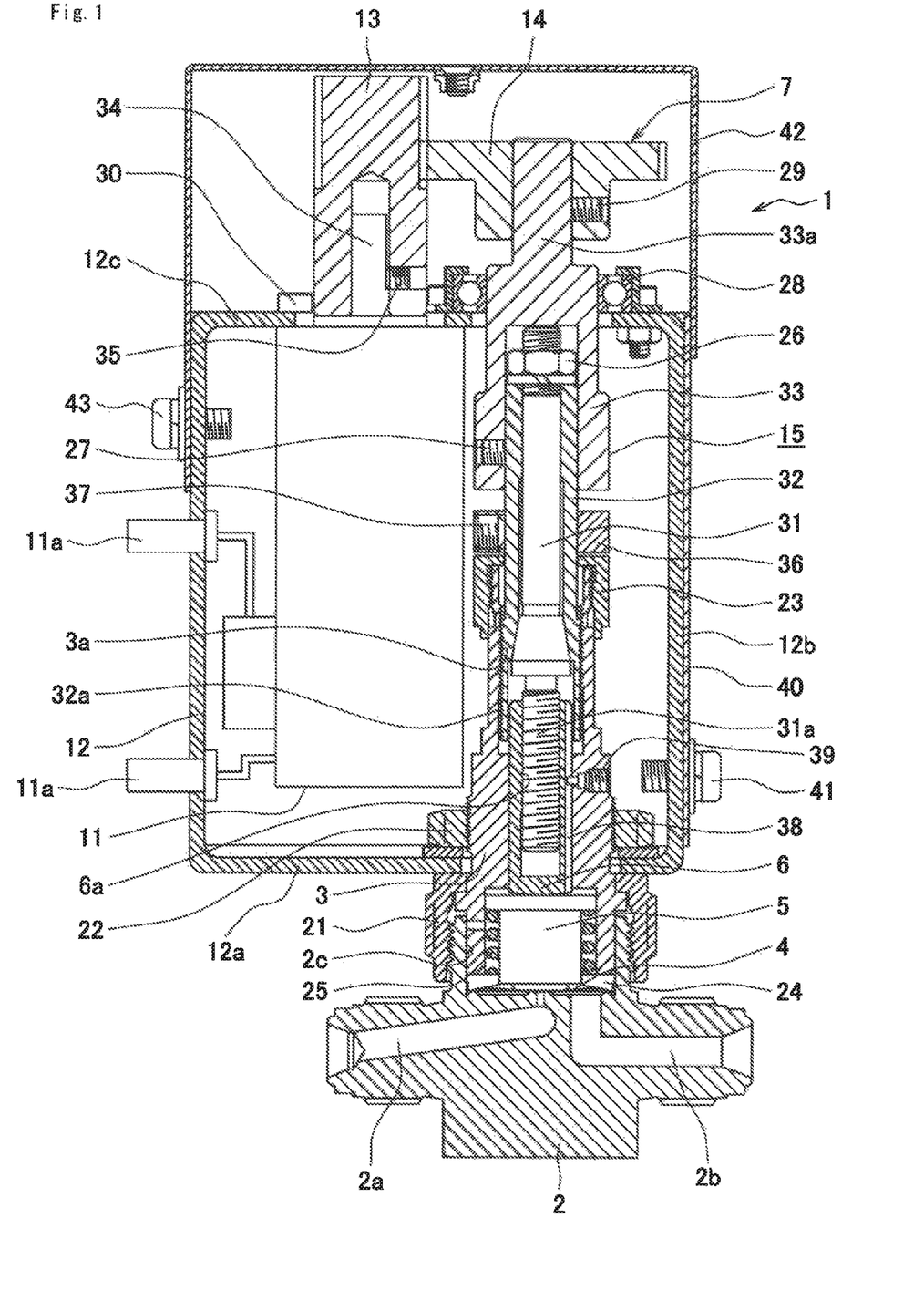
FIG. 1 is a longitudinal sectional view of a flow rate adjustment valve in accordance with one embodiment of the present invention.
Figure 2:
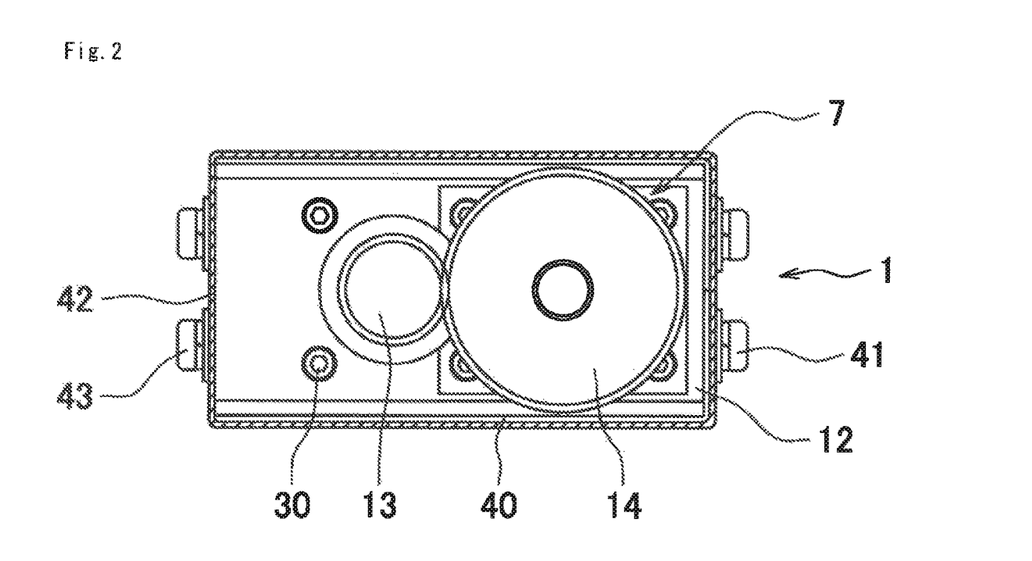
FIG. 2 is a plan view of FIG. 1.

Embodiments of the present invention will be described below with reference to the drawings. In the following description, the upper and lower sides and the left and right sides of FIG. 1 are referred to as "upper" and "lower" sides and "left" and "right" sides, respectively. Moreover, the upper and lower sides of FIG. 2 are referred to as "front" and "rear" sides, respectively. These terms "upper", "lower", "left", "right", "front", and "rear" are used for convenience's sake. For an actual use, a flow rate adjustment valve of the present invention may be used as appropriate so as to be arranged upside down, or so as to be arranged with the vertical direction thereof being directed horizontally.

As shown in FIG. 1, a flow rate adjustment valve 1 includes: a blocklike body 2 having a fluid inflow passage 2a, a fluid outflow passage 2b, and a recess 2c that is open upward; a tubular bonnet 3 having a lower end portion screwed in an upper portion of the recess 2c of the body 2 and extending upward; a metal diaphragm (valve element) 4 that is pressed against or separated from a peripheral edge portion of an outlet of the fluid inflow passage 2a to close or open the fluid inflow passage 2a, respectively; a vertically movable body 6 that causes the diaphragm 4 to be pressed against or separated from the peripheral edge portion of the outlet of the fluid inflow passage 2a via a diaphragm presser 5; and an opening-degree adjustment means 7.

The opening-degree adjustment means 7 is configured to adjust an opening degree between the fluid inflow passage 2a and the fluid inflow passage 2a by positioning the vertically movable body 6 at a predetermined position, and includes: a motor 11; a square-tube-shaped casing 12 consisting of a bottom wall 12a, left and right side walls 12b, and a top wall 12c, and accommodating, at a left half portion thereof, the motor 11; and a rotation member 15 that is rotated by the motor 11 via gears 13, 14.

The bonnet 3 has the lower end portion that is fixed to the body 2 via a cap nut 21 and has an intermediate portion that is fixed to a right half portion of the bottom wall 12a of the casing 12 via a nut 22. The bonnet 3 has an upper end portion that is provided with a male screw portion, on which a cap nut 23 is screwed.

Between a lower end of the bonnet 3 and the body 2, a presser adapter 24 is disposed which fixes a peripheral edge portion of the diaphragm 4. Between the presser adapter 24 and a flange disposed at an upper end portion of the diaphragm presser 5, a compression coil spring 25 is disposed which urges the diaphragm presser 5 upward.

The rotation member 15 includes: a shaft portion 31 provided at a lower portion thereof with a male screw 31a; an inner tubular portion 32 mounted on the shaft portion 31; and an outer tubular portion 33 mounted on an upper portion of the inner tubular portion 32.

The shaft portion 31 is inserted through the inner tubular portion 32 such that an upper end portion of the shaft portion 31 protrudes upward. A nut 26 that is screwed on the upper end portion of the shaft portion 31 is fastened whereby the shaft portion 31 and the inner tubular portion 32 are coupled. Moreover, the outer tubular portion 33 and the inner tubular portion 32 are coupled by a setscrew 27 that is screwed into a screw hole formed in the outer tubular portion 33 so as to penetrate in the radial direction. In this configuration, rotating the outer tubular portion 33 causes the inner tubular portion 32 and the shaft portion 31 to be rotated integrally together with the outer tubular portion 33.

The outer tubular portion 33 is supported rotatably by the casing 12 via an antifriction bearing 28 fixed on an upper surface of the top wall 12c of the casing 12. The outer tubular portion 33 is provided at an upper end portion thereof with a columnar protruding portion 33a. To the protruding portion 33a, the driven gear 14 is fixed by a setscrew 29.

The motor 11 is a stepping servo motor into which an encoder is incorporated. The shape of the motor 11 is a rectangular parallelepiped having a square cross section, and the motor 11 is attached, in a suspended way, to a left portion of the top wall 12c of the casing 12 via bolts 30. The motor 11 has a rotary shaft 34 that protrudes upward from the top wall 12c of the casing 12. To this protruding portion, the driving gear 13 is fixed via a setscrew 35. The motor 11 is provided with terminals 11a which enable connection to external devices.

The driving gear 13 and the driven gear 14 each have an axis extending vertically and are arranged side by side with the driving gear 13 disposed at the left and the driven gear 14 at the right. The vertical dimension of the driving gear 13 is greater than that of the driven gear 14. With these dimensions, even in the case where the driven gear 14 moves vertically, the driving gear 13 and the driven gear 14 do not move out of engagement.

An opening portion of the casing 12 is covered with a U-shaped side cover 40, which is fixed to the right side wall 12b of the casing 12 via machine screws 41. In addition, the top wall 12c of the casing 12 is covered with a top cover 42 so as to cover the driving gear 13 and the driven gear 14 that are located above the top wall 12c, and the top cover 42 is fixed to the left side wall 12b of the casing 12 via machine screws 43. The top cover 42 is a transparent resin product made of acrylic resin, PET, and the like. The rotation condition of the gears 13, 14 can be observed through this top cover 42 from outside. Moreover, when a trouble occurs at the gear 13, 14 portions, only the top cover 42 is removed whereby any necessary treatment can be performed.

An annular stopper 36 is disposed so as to be slightly spaced apart from an upper surface of the cap nut 23 located at the upper end portion of the bonnet 3. The stopper 36 is fitted onto an outer periphery of the inner tubular portion 32 so as to be vertically movable, is positioned at a vertically predetermined position, and is fixed to the inner tubular portion 32 via a setscrew 37. The stopper 36 is designed so as to come into contact with the upper surface of the cap nut 23 when the rotation member 15 moves downward. With this configuration, the rotation member 15 is restricted from moving downward further from the position at the time when the flow rate adjustment valve 1 is in a fully closed state.

The inner tubular portion 32 is provided, on an outer periphery of the lower portion thereof, with a male screw 32a. The bonnet 3 is provided, on an inner periphery of the upper portion thereof, with a female screw 3a corresponding to the male screw 32a of the inner tubular portion 32. With these screws 32a and 3a, the bonnet 3 and the inner tubular portion 32 are screw-engaged so as to be relatively rotatable.

The vertically movable body 6 has a tubular shape with a bottom. On an inner periphery of the vertically movable body 6, a female screw 6a is formed which is screwed on a male screw 31a of the shaft portion 31 of the rotation member 15. The vertically movable body 6 is screwed on the male screw 31a of the shaft portion 31 with an upper end portion of the vertically movable body 6 being inserted into a lower end portion of the inner tubular portion 32.

The male screw 31a of the shaft portion 31 of the rotation member 15 and the female screw 6a of the vertically movable body 6 (first screw-engagement) are designed to have a screw pitch smaller than that of the female screw 3a of the bonnet 3 and the male screw 32a of the inner tubular portion 32 (second screw-engagement). The orientation of the thread when the first and second screw-engagements are achieved is set so that the vertically movable body 6 moves downward when the rotation member 15 is rotated to be moved downward.

The diaphragm presser 5 is inserted in a recess, which is formed at the lower end portion of the bonnet 3 and is open downward, so as to be vertically movable. When the vertically movable body 6 moves downward, the diaphragm presser 5, which is pressed by the vertically movable body 6, moves downward integrally with the vertically movable body 6. When the vertically movable body 6 moves upward, the diaphragm presser 5 moves upward integrally with the vertically movable body 6 due to the elastic force of the compression coil spring 25.

The vertically movable body 6 is provided on an outer periphery thereof with a guide groove 38 extending in the vertical direction. In the bonnet 3, provided is a guide pin 39 having an axis extending in a direction orthogonal to the vertical direction, so as to face the guide groove 38 from the radially outside. The guide pin 39 is provided, on an outer periphery other than the distal end portion of the guide pin 39, with a male screw. The male screw is screwed into a screw hole formed in the bonnet 3, whereby the guide pin 39 is fixed to the bonnet 3. The distal end portion of the guide pin 39 is fitted into the guide groove 38, whereby the vertically movable body 6 is impossible to rotate with respect the bonnet 3 and is movable vertically.

In the opening-degree adjustment means 7, by rotating the outer tubular portion 33 of the rotation member 15 in the descending direction, the inner tubular portion 32 and the shaft portion 31, integrally with the outer tubular portion 33, descend while rotating. The vertically movable body 6 screwed on the shaft portion 31 descends in a state where the vertically movable body 6 is prevented from rotating because the guide pin 39 is fitted into the guide groove 38. At this time, the screw pitch of the first screw-engagement (the screw-engagement between the male screw 31*a* of the shaft portion 31 of the rotation member 15 and the female screw 6*a* of the vertically movable body 6) is smaller than the screw pitch of the second screw-engagement (the screw-engagement between the female screw 3*a* of the bonnet 3 and the male screw 32*a* of the inner tubular portion 32), whereby the vertically movable body 6 is configured to descend by the amount of the difference in the screw pitch. This, therefore, enables adjustment with high precision.

In the above-described flow rate adjustment valve 1, the motor 11 has a transverse cross section having the shape of a square of side 25 mm, and regarding the size of a plane shown in FIG. 2 (shape of the transverse cross section of the covers 40, 42), the front-rear breadth is 36 mm or shorter, that is, in spite of the fact that the motor 11 is added to change the valve from a manual valve type to a motor-operated type, the increased amount in the front-rear breadth of the flow rate adjustment valve 1 is suppressed, as compared to the manual valve. In addition, also regarding the vertical dimension of the flow rate adjustment valve 1, the increased amount thereof is suppressed, as compared to the height defined by the manual valve in addition to the space required for the operation by hand. Therefore, in an existing fluid control apparatus in which the flow rate adjustment valve of a manual valve type is used, the manual valve may be replaced with a motor-operated flow rate adjustment valve 1 without necessitating the increase of the installation space. It should be noted that even when the motor 11 has a transverse cross section having the shape of a square of side 35 mm or shorter, regarding the size of the plane of the flow rate adjustment valve 1 (shape of the transverse cross section of the covers 40, 42), the front-rear breadth thereof can be made 36 mm or shorter.

The encoder incorporated into the motor 11 transmits 9600 pulses per rotation. The gear ratio is 2.2857. The motor 11 rotates around 10 times, and the resolution of the motor 11 is therefore 219, 427 pulses. When the resolution is 2000 pulses or greater, required precision can be obtained.

Figure 3:
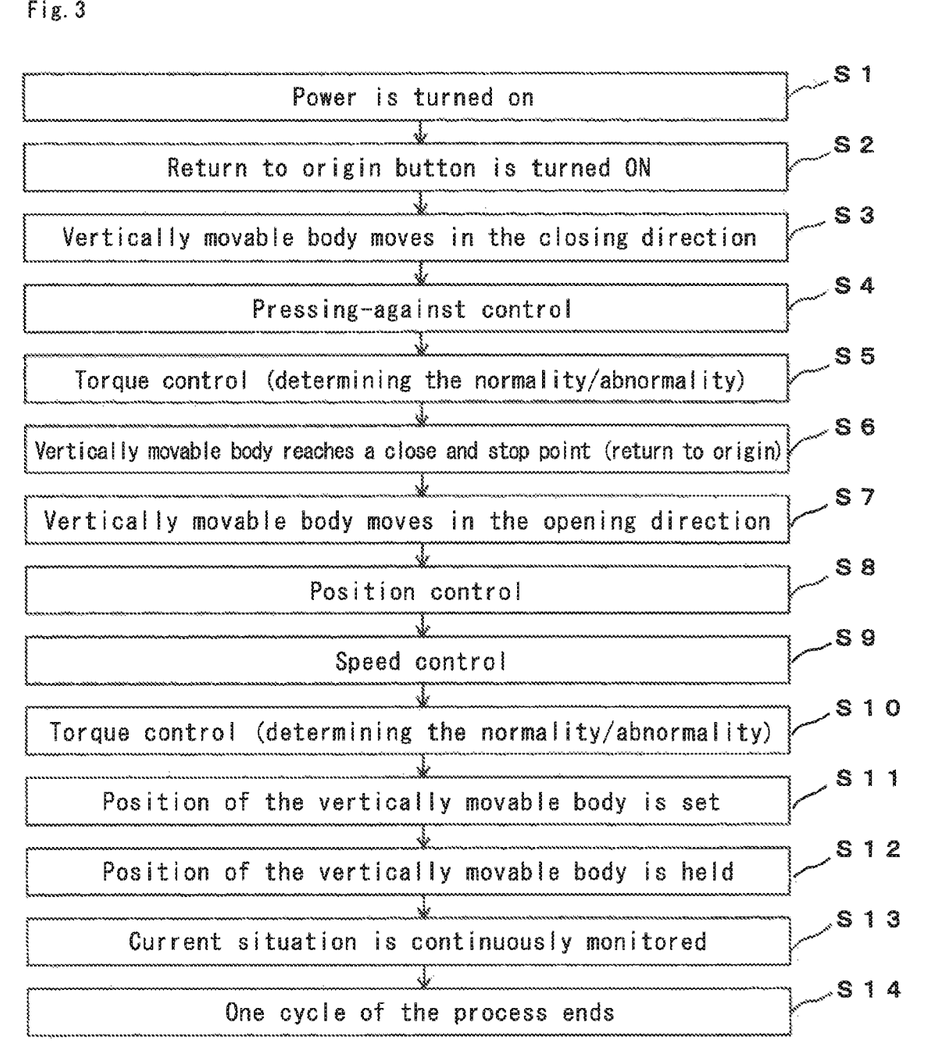
FIG. 3 is a flowchart showing operational steps of the flow rate adjustment valve in accordance with the present invention.

FIG. 3 shows operational steps of the flow rate adjustment valve 1, which are performed by a controller of the motor 11.

First, after the power is turned on (S1), a "return to origin" button is turned ON on the screen of a personal computer (S2), to cause the motor 11 to start driving. At this point, signals from the encoder are not linked, so the closed loop control cannnot be performed and the motor 11 is therefore rotated in the closing direction at a continuous rated torque or lower. This causes the vertically movable body 6 to move in the closing direction (S3). The control to be performed at this time is pressing-against control (S4) in which the vertically movable body 6 continues to move until reaching torque of a predetermined value. At this time, the torque value is constantly monitored to determine the normality/abnormality (S5). In the case where the abnormality is determined, a warning is issued to stop the driving of the motor 11.

When the torque reaches the predetermined value and this torque continues for a predetermined time period or longer without torque abnormality being determined, it is determined that the vertically movable body 6 reaches a close and stop point (return to origin) (S6). For example, in the case where the torque reaches a predetermined value (for example, 95%) or greater with respect to the continuous rated torque, and the predetermined time period (for example, 2 seconds) or longer elapses, the "return to origin" is determined.

Thereafter, the motor 11 is rotated in the opening direction whereby the vertically movable body 6 moves in the opening direction (S7). The control to be performed at this time is the position control (S8) and the closed loop control on the basis of the encoder signals is performed. At this time, the speed control (S9) is also performed in which the operation time for operating the rotation member 15 is set at an appropriate value within a range of 0.1 to 120 seconds per rotation whereby the moving speed of the vertically movable body 6 is maintained approximately at the same level as the operating speed by hand. The torque value is constantly monitored to determine the normality/abnormality (S10). In the case where the abnormality is determined, a warning is issued to stop the driving of the motor 11. At the time when the operation is performed toward the target encoder position while aiming to perform positioning at a predetermined opening degree, and in the case where instant maximum torque 1.4 times the continuous rated torque is generated, there is an abnormality in the flow rate adjustment valve 1, and therefore the operation is not performed even at a torque value 1.4 times the rated value, the deviation from the target point of the encoder is caused whereby an error is immediately determined.

In the case where there is no abnormality, at the time point at which the amount of rotation corresponding to the set opening degree is reached, the rotation of the motor 11 is stopped (S11). The resolution from the fully closed state to the fully open state of the flow rate adjustment valve 1 is approximately 200,000 pulses (2000 pulses or greater) as described above, where extremely severe positioning can be performed in positioning of the opening degree setting. Thereafter, the position of the vertically movable body 6 is held (S12) so as to maintain this opening degree. After the return to origin, the closed loop control is performed on the basis of the encoder signals, and therefore as long as the positioning of the opening degree can be performed and as long as no extraneous disturbance is caused, the opening degree can be maintained at a minimally required torque.

That is, in order to cause the minimum current to flow, heat generation of the motor 11 per se can be made almost zero. On the screen of the personal computer, the current situation is continuously monitored (S13) and when there is no abnormality, one cycle of the process ends (S14).

Figure 4:
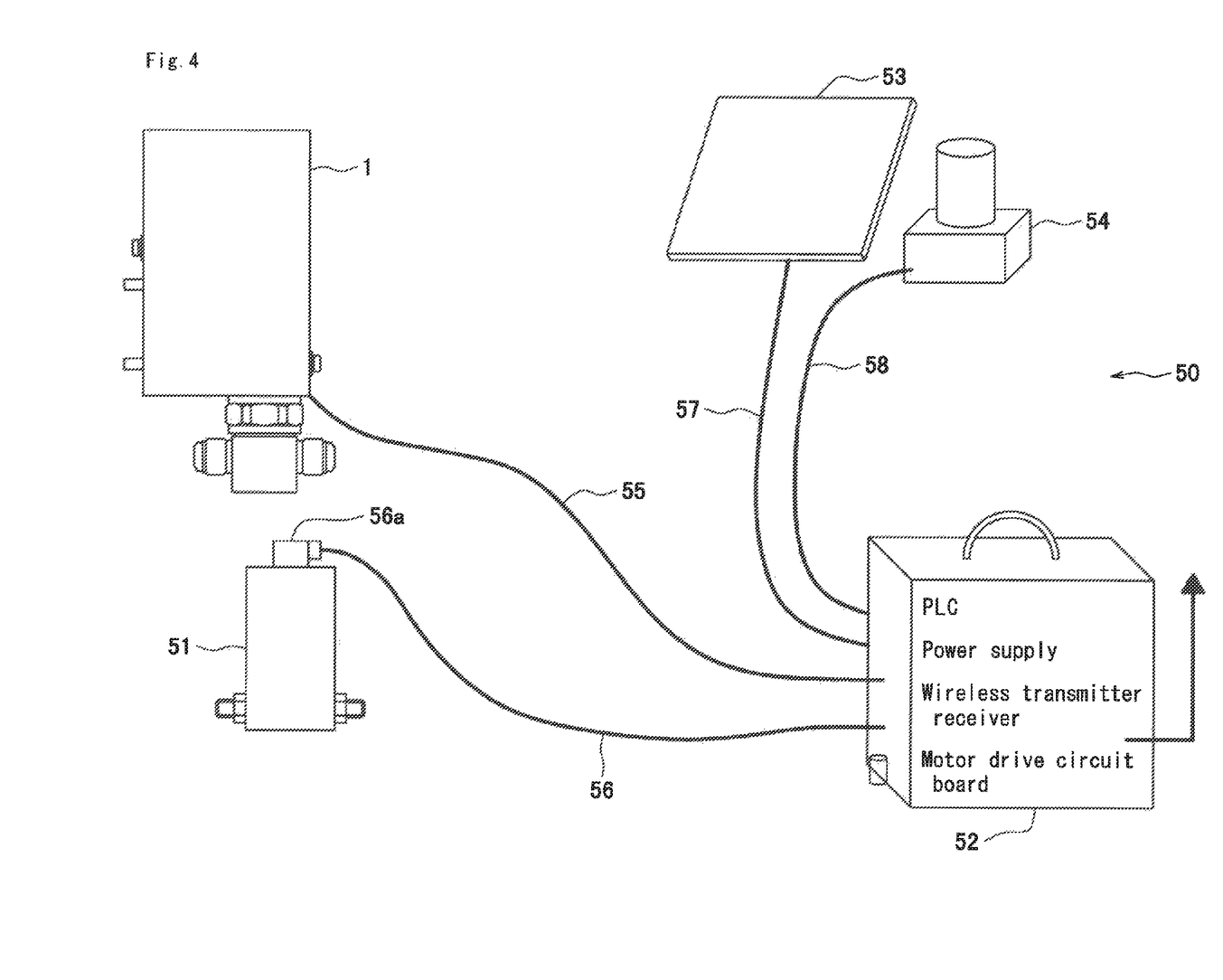
FIG. 4 shows an example of a fluid control apparatus to which the flow rate adjustment valve in accordance with the present invention is applied.

FIG. 4 shows an example of the fluid control apparatus 50 provided with the above-described flow rate adjustment valve 1.

This fluid control apparatus 50 includes eight lines of the flow rate adjustment valves 1 and mass flowmeters 51 provided on an upstream side of the respective flow rate adjustment valves 1. On a downstream side of the fluid control apparatus 50, semiconductor manufacturing equipment such as an epitaxial apparatus is disposed. To the semiconductor manufacturing equipment, a fluid having a predetermined flow rate is supplied through each of the flow rate adjustment valves 1.

The fluid control apparatus 50 is further provided with: a control box 52 to be connected to the eight lines of the flow rate adjustment valves 1 and the massflow meters 51; a personal computer (monitoring device) 53; a PATLITE (Registered Trademark) as warning output means.

Into the control box 52, a programmable logic controller (PLC) to be connected to each flow rate adjustment valve 1 and each massflow meter, a power supply, a wireless transmitter receiver, a motor drive circuit board, and the like, are incorporated.

The PATLITE (Registered Trademark) 54: causes a green lamp to illuminate at the time of normal operation; causes both of the green and red lamps to illuminate at the time when any one of the motors 11 incorporated in the flow rate adjustment valves 1 becomes abnormal; and causes both green and red lamps to be turned off at the time of the PLC breakdown or turning off of the power supply.

The control box 52 and the flow rate adjustment valves 1 are connected by eight valve cables 55 in total. The control box 52 and the mass flow meters 51 are connected by eight MFM cables 56 in total each having an L-shaped connector 56a. The control box 52 and the personal computer 53 are connected by a LAN cable 57. The control box 52 and the PATLITE (Registered Trademark) 54 are connected via a cable 58 for warning. The length of each of the cables 55, 56, 57, 58 is, for example, approximately 5 m.

From the personal computer 53, setting of the opening degree and monitoring of the flow rate can be performed for all the flow rate adjustment valves 1.

With this fluid control apparatus 50, the opening degrees of the flow rate adjustment valves 1 can be collectively administered. In addition, storing data on the torque and the like in the personal computer 53 enables comparison between the initial data and the current data whereby evaluation of the deterioration state of the flow rate adjustment valve 1 can be performed. Moreover, re-use of the opening degree value or the like that has been stored becomes possible, which facilitates setting of the opening degree.

Regarding the above description, the personal computer 53 may be replaced with an appropriate terminal (monitoring device) such as a tablet computer, a smartphone, or the like. Such a monitoring device may be one that enables remote control to be performed away from the installation location of the fluid control apparatus 50.

Into each of the flow rate adjustment valves 1, various types of sensors maybe incorporated, in addition to the function to measure torque. For example, by incorporating a MEMS microphone therein, the driving operation of the flow rate adjustment valve 1 may be ascertained remotely, and, together with torque signals, an abnormality on driving of the flow rate adjustment valve 1 may be determined. Moreover, by incorporating a small-sized CCD therein, the operation of the gears 13, 14 at the time of the driving thereof may be confirmed remotely, and presence/absence of an abnormality may be determined. Furthermore, by incorporating a MEMS humidity sensor therein, whether the humidity around the motor 11 is normal may be determined. Still furthermore, by incorporating a MEMS temperature sensor therein, whether the temperature around the motor 11 is normal may be determined. Yet still furthermore, by incorporating a MEMS acceleration sensor therein, whether the vibration of the motor 11 per se is normal may be determined.

In the above description, the configuration other than the motor 11 and the driving and driven gears 13, 14 (that is, the configuration other than the rotation device), is not limited to the one shown in the drawings, and may be modified to various configurations of the flow rate adjustment valves. In addition, the fluid control apparatus 50 is not limited to the one shown in the drawings, and may be modified to various fluid control apparatuses, to which the flow rate adjustment valve including the above-described motor 11 and gears 13, 14 is applicable.

INDUSTRIAL APPLICABILITY

In accordance with the present invention, a flow rate adjustment valve of a motor-operated valve type is obtained, which overcomes the problems that flow rate adjustment valves of a manual valve type have, while making full use of compactness the manual valves have. Therefore, such a flow rate adjustment valve can contribute to improvement in performance: of the fluid control apparatus in which the flow rate adjustment valve is used; and of the semiconductor manufacturing line in which the fluid control apparatus is used.

The invention claimed is:

1. A flow rate adjustment valve including: a body provided with a fluid passage; a valve element configured to open and close the fluid passage; a vertically movable body that moves upward or downward whereby an opening degree of the fluid passage is adjusted, the opening degree of the fluid passage being defined by the valve element; a rotation member that is screwed on the vertically movable body; and a rotation device configured to rotate the rotation member thereby causing the vertically movable body to move upward or downward, wherein the rotation device comprises a driven gear disposed at a part of the rotation member, a driving gear engaged with the driven gear, and a motor configured to rotate the driving gear, and the motor is a stepping servo motor and has a rotary shaft to which the driving gear is fixed, wherein the driving gear and the driven gear each have an axis extending vertically and a vertical dimension of the driving gear is greater than that of the driven gear, with these dimensions, even in the case where the driven gear moves vertically, the driving gear and the driven gear do not move out of engagement.

2. The flow rate adjustment valve according to claim 1, wherein the motor is disposed so as to be adjacent to the rotation member, the rotary shaft of the motor extends upward, and the driving gear is fixed to an upper end portion of the rotary shaft.

3. A fluid control apparatus comprising a plurality of lines each having a flow rate adjustment valve in which an opening degree is set at a predetermined value, wherein each of the flow rate adjustment valves of the plurality of the lines is the flow rate adjustment valve according to claim 2, and an amount of motion of the motor of each flow rate adjustment valve is monitored by a monitoring device connected.

4. A fluid control apparatus comprising a plurality of lines each having a flow rate adjustment valve in which an opening degree is set at a predetermined value, wherein each of the flow rate adjustment valves of the plurality of the lines is the flow rate adjustment valve according to claim 1, and an amount of motion of the motor of each flow rate adjustment valve is monitored by a monitoring device connected.

5. A flow rate adjustment valve including: a body provided with a fluid passage; a valve element configured to open and close the fluid passage; a vertically movable body that moves upward or downward whereby an opening degree of the fluid passage is adjusted, the opening degree of the fluid passage being defined by the valve element; a rotation member that is screwed on the vertically movable body; and a rotation device configured to rotate the rotation member thereby causing the vertically movable body to move upward or downward, wherein the rotation device comprises a driven gear disposed at a part of the rotation member, a driving gear engaged with the driven gear, and a motor configured to rotate the driving gear, and the motor is a stepping servo motor and has a rotary shaft to which the driving gear is fixed, wherein the motor has four functions of: position control of controlling a position with a closed loop by signals from an encoder; speed control of controlling a rotational speed of the rotation member; pressing-against control of moving the rotation member in a 0% opening-degree direction at continuous rated torque or lower until a torque value reaches a predetermined value or greater; and torque control of controlling torque, and detection of a 0% opening-degree position is performed by the function of the pressing-against control, a setting of a predetermined opening degree is performed by the function of the position control and the function of the speed control, and when the detection of the 0% opening-degree position and the setting of the predetermined opening degree are performed, a torque abnormality is determined by the function of the torque control.

6. The flow rate adjustment valve according to claim 5, wherein the motor is disposed so as to be adjacent to the rotation member, the rotary shaft of the motor extends upward, and the driving gear is fixed to an upper end portion of the rotary shaft.

7. A fluid control apparatus comprising a plurality of lines each having a flow rate adjustment valve in which an opening degree is set at a predetermined value, wherein each of the flow rate adjustment valves of the plurality of the lines is the flow rate adjustment valve according to claim 5, and an amount of motion of the motor of each flow rate adjustment valve is monitored by a monitoring device connected.

\* \* \* \* \*